United States Patent
Nehl et al.

(10) Patent No.: US 6,866,127 B2
(45) Date of Patent: Mar. 15, 2005

(54) PISTON DAMPER ASSEMBLY, AND DUST TUBE SUBASSEMBLY, HAVING A VELOCITY SENSOR

(75) Inventors: Thomas W. Nehl, Shelby Township, MI (US); Fang Deng, Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/643,524

(22) Filed: Aug. 19, 2003

(65) Prior Publication Data

US 2004/0089506 A1 May 13, 2004

Related U.S. Application Data

(60) Provisional application No. 60/429,592, filed on Nov. 27, 2002, and provisional application No. 60/405,136, filed on Aug. 21, 2002.

(51) Int. Cl.⁷ ................................................. F16F 9/512
(52) U.S. Cl. ............... 188/266.1; 188/267; 188/322.12; 188/280
(58) Field of Search ............................. 188/267, 267.1, 188/267.2, 280, 266.1, 322.12, 1.11 E; 91/5 R–5 L

(56) References Cited

U.S. PATENT DOCUMENTS

| | | | | |
|---|---|---|---|---|
| 5,009,450 A | * | 4/1991 | Herberg et al. .......... 188/266.1 |
| 5,191,283 A | * | 3/1993 | Gesenhues .................. 324/174 |
| 5,233,293 A | * | 8/1993 | Huang et al. .......... 324/207.15 |
| 5,238,092 A | * | 8/1993 | Huang ...................... 188/266.2 |
| 5,251,729 A | * | 10/1993 | Nehl et al. ................ 188/266.1 |
| 5,254,009 A | * | 10/1993 | Wormann ..................... 439/34 |
| 5,451,870 A | * | 9/1995 | Gesenhues et al. ..... 324/207.15 |
| 6,378,671 B1 | | 4/2002 | Carlson | |
| 6,508,342 B2 | | 1/2003 | Pape et al. | |
| 6,516,926 B2 | | 2/2003 | Lisenker et al. | |
| 2002/0100649 A1 | * | 8/2002 | Agrotis et al. ........... 188/266.1 |

* cited by examiner

*Primary Examiner*—Robert A. Siconolfi
*Assistant Examiner*—Devon Kramer
(74) *Attorney, Agent, or Firm*—Michael D. Smith

(57) ABSTRACT

A piston damper assembly includes a piston damper and a relative velocity sensor. The piston damper includes a damper body, a piston rod, and a dust tube which is attached to the piston rod. The relative velocity sensor includes an axially extending first magnet supported by the dust tube, a flux collector, and a first sensor coil. The flux collector is supported by the dust tube, includes an axially-extending first prong in axially-extending contact with the first magnet, includes an axially-extending second prong, and includes a joining member connecting the first and second prongs. The first sensor coil surrounds the joining member and/or one of the first and second prongs. A piston-damper dust tube subassembly includes the dust tube and the relative velocity sensor.

20 Claims, 3 Drawing Sheets

PISTON DAMPER ASSEMBLY, AND DUST TUBE SUBASSEMBLY, HAVING A VELOCITY SENSOR

CROSS REFERENCE TO RELATED APPLICATIONS

The present application claims priority of U.S. Provisional Application No. 60/405,136 filed Aug. 21, 2002. and U.S. Provisional Application No. 60/429,592 filed Nov. 27, 2002, the entire disclosures of which are incorporated herein by reference.

TECHNICAL FIELD

The present invention relates generally to piston dampers, and more particularly to a piston damper assembly, and a dust tube subassembly thereof, having a relative velocity sensor.

BACKGROUND OF THE INVENTION

Conventional piston damper assemblies include a piston damper and a relative velocity sensor. The piston damper includes an annularly-cylindrical damper body, includes a ferromagnetic piston rod which is axially movable within the damper body and which extends axially outward from a first end of the damper body and is attached to the vehicle frame, and includes a ferromagnetic dust tube which circumferentially surrounds the damper body and which is attached to the piston rod. The relative velocity sensor has a magnet and a coil. The magnet is an annular disc magnet which circumferentially surrounds the piston rod and which is attached to the first end of the damper body. The coil is an axially-distributed coil which is coaxially aligned with the piston rod, which axially extends the entire length of the piston rod travel, and which is attached to the inside of the dust tube. The piston rod acts as a magnetic flux carrier with the flux exiting the damper body in the radial direction across a cylindrical gap to the axially-distributed coil on the dust tube. The voltage induced in the coil due to the motion of the damper body relative to the dust tube is proportional to the relative velocity of the damper body relative to the dust tube. The operation of a conventional a relative velocity sensor is well understood in the art. However, with dampers having relatively long strokes (such as a stroke greater than four times the inside diameter of the damper body), a conventional relative velocity sensor provides inaccurate relative velocity measurements because of the flux leakage from the piston rod. Also, when the piston damper is an MR (magnetorheological) damper, the flux produced by the MR solenoid interferes with a conventional relative velocity sensor causing inaccurate relative velocity measurements.

What is needed is an improved piston damper assembly, and an improved dust tube subassembly thereof, having a velocity sensor.

SUMMARY OF THE INVENTION

In a first expression of an embodiment of the invention, a piston damper assembly includes a piston damper and a relative velocity sensor. The piston damper includes a damper body, includes a piston rod which is axially movable within the damper body and which is attachable to a vehicle frame, and includes a dust tube which circumferentially surrounds at least an axial portion of the damper body and which is attached to the piston rod. The relative velocity sensor includes spaced apart and axially extending first and second magnets which are supported by the dust tube, includes a flux collector, and includes spaced-apart first and second sensor coils. The flux collector is supported by the dust tube, includes an axially-extending first prong in axially-extending contact with the first magnet, includes an axially-extending second prong in axially-extending contact with the second magnet, and includes a joining member connecting the first and second prongs. The first sensor coil surrounds the joining member and/or the first prong and the second sensor coil surrounds the joining member and/or the second prong.

In a second expression of an embodiment of the invention, a piston damper assembly includes a piston damper and a relative velocity sensor. The piston damper includes a damper body, includes a piston rod which is axially movable within the damper body, and includes a dust tube which is attached to the piston rod. The relative velocity sensor includes an axially extending first magnet which is supported by the dust tube, includes a flux collector, and includes a first sensor coil. The flux collector is supported by the dust tube, includes an axially-extending first prong in axially-extending proximity with the first magnet, includes an axially-extending second prong, and includes a joining member connecting the first and second prongs. The first sensor coil surrounds the joining member and/or one of the first and second prongs.

In a third expression of an embodiment of the invention, a piston-damper dust tube subassembly includes an axially-extending piston-damper dust tube and includes a relative velocity sensor. The relative velocity sensor includes an axially extending first magnet which is supported by the dust tube, includes a flux collector, and includes a first sensor coil. The flux collector is supported by the dust tube, includes an axially-extending first prong in axially-extending proximity with the first magnet, includes an axially-extending second prong, and includes a joining member connecting the first and second prongs. The first sensor coil surrounds the joining member and/or one of the first and second prongs.

Several benefits and advantages are derived from one or more of the expressions of an embodiment of the invention. Having axially-extending flux collector prongs and an axially-extending magnet supported by the dust tube and having a sensor coil surround the flux collector, instead of having the piston rod act as a flux carrier, improves the accuracy of relative velocity measurements when the piston damper is a magnetorheological piston damper and/or when the piston rod undergoes a relatively long stroke, as can be appreciated by those skilled in the art.

DESCRIPTION OF THE PREFERRED EMBODIMENT

Figure 1:
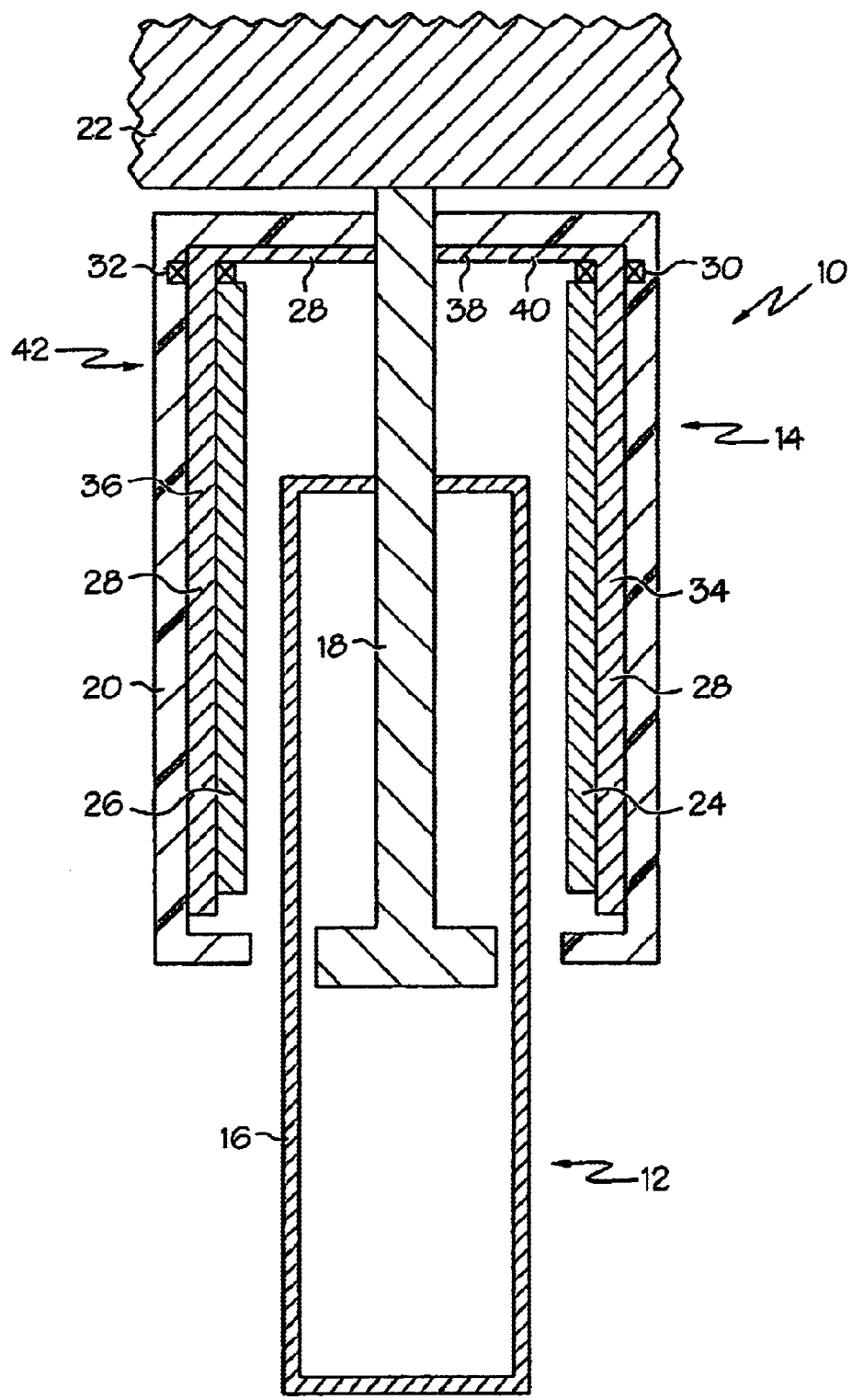
FIG. 1 is a longitudinal cross-sectional view of a first embodiment of the invention including a piston damper assembly and a dust tube subassembly thereof, wherein the sensor coils surround the prongs of the flux collector, and with the piston damper shown in jounce.

Referring now to the drawings, wherein like numerals represent like elements throughout, FIG. 1 shows a first embodiment of the present invention. A first expression of the first embodiment is for a piston damper assembly 10 including a piston damper 12 and a relative velocity sensor 14. The piston damper 12 includes a damper body (i.e., a damper cylinder) 16, a piston rod 18, and a dust tube 20. The piston rod 18 is axially movable within the damper body 16 and is attachable to a vehicle frame 22 (only a portion of which is shown in FIG. 1). The dust tube 20 circumferentially surrounds at least an axial portion of the damper body 16 and is attached to the piston rod 18. The relative velocity sensor 14 includes spaced apart and axially extending first and second magnets 24 and 26 which are supported by the dust tube 20, includes a flux (i.e., magnetic flux) collector 28, and includes spaced apart first and second sensor coils 30 and 32. The flux collector 28 is supported by the dust tube 20, includes an axially-extending first prong 34 in axially-extending contact with the first magnet 24, includes an axially-extending second prong 36 in axially-extending contact with the second magnet 26, and includes a joining member 38 connecting the first and second prongs 34 and 36. The first sensor coil 30 surrounds the joining member 38 and/or the first prong 34, and the second sensor coil 32 surrounds the joining member 38 and/or the second prong 36. The term "attached" includes directly attached or indirectly attached. The term "supported" includes directly supported or indirectly supported.

The relative velocity sensor 14 is used to measure the relative velocity of the damper body 16 relative to the dust tube 20. In one implementation of the first expression of the embodiment of FIG. 1, the voltage induced in the sensor coils from the relative velocity of the damper body 16 relative to the dust tube 20 is substantially proportional to such relative velocity, as can be appreciated by those skilled in the art. In the same or a different implementation, the piston damper 12 is a magnetorheological damper.

In one choice of materials for the first expression of the embodiment of FIG. 1, the dust tube 20 is not magnetizable such as being a plastic dust tube. In the same or a different choice of materials, the flux collector 28 is magnetizable and consists essentially of a ferromagnetic material such as steel. In the same or a different choice of materials, in an example where the magnets 24 and 26 are permanent magnets, the first and second magnets 24 and 26 consist essentially of Alnico 8 or bonded NdFeB or other suitable permanent magnet material. In the same or a different choice of materials, the piston rod 18 consists essentially of a low-magnetic stainless steel or a nonmagnetic stainless steel, and the damper body 16 consists essentially of steel. In one arrangement, the first and second sensor coils 30 and 32 are connected in series.

In one example of the first expression of the embodiment of FIG. 1, the first and second prongs 34 and 36 are attached to the inside of the dust tube 20. In the same or a different example, the first magnet 24 is attached to the first prong 34, and the second magnet 26 is attached to the second prong 36. In the same or a different example, the joining member 38 includes a ring 40 coaxially aligned with the dust tube 20. In one design, the first and second magnets 24 and 26 do not axially extend to the ring 40 but are axially spaced apart from the ring 40. In one illustration, the first and second magnets 24 and 26 axially extend a distance which is greater than the inside diameter of the damper body 16, and in one variation axially extend a distance at least equal to substantially the stroke of the piston rod 18. In the same or a different illustration, the first and second prongs 34 and 36 axially extend a distance which is greater than the inside diameter of the damper body 16, and in one variation axially extend a distance at least equal to substantially the stroke of the piston rod 18.

In one variation of the first expression of the embodiment of FIG. 1, the first and second prongs 34 and 36 and the first and second magnets 24 and 26 are substantially aligned along a diameter of the dust tube 20. In this variation, the first prong 34 and the first magnet 24 are one-hundred eighty degrees apart from the second prong 36 and the second magnet 26. In one modification, the first sensor coil 30 surrounds the first prong 34, and the second sensor coil 32 surrounds the second prong 36. In an application where the piston rod 18 is attached to a vehicle frame 22 and is substantially vertically oriented, the first and second sensor coils 30 and 32 are said to be vertically mounted. It is noted that all of the magnetic flux will flow through both the first and second sensor coils 30 and 32 improving the signal level of the relative velocity sensor 14, as is understood by the artisan.

Figure 2:
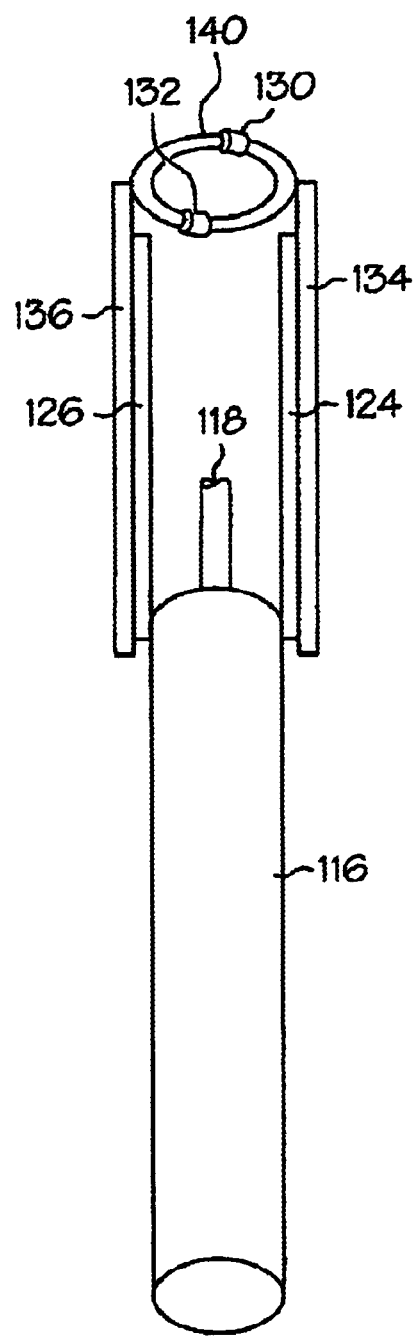
FIG. 2 is a perspective exterior view of the piston damper assembly of FIG. 1, with the dust tube omitted for clarity, with only a portion of the piston rod shown, with the piston damper shown in rebound, and with an alternate placement of the sensor coils, wherein the sensor coils surround segments of the ring of the flux collector.

An alternate placement of the first and second sensor coils 130 and 132 is shown in FIG. 2. In FIG. 2, the first sensor coil 130 surrounds a first circumferential segment of the ring 140, the second sensor coil 132 surrounds a second circumferential segment of the ring 140, and a line between the first and second sensor coils 130 and 132 is substantially perpendicular to the diameter aligned with the first and second magnets 124 and 126 and prongs 134 and 136. FIG. 2 also shows the piston rod 118 and the damper body 116, but the dust tube has been omitted for clarity. In an application where the piston rod is attached to a vehicle frame and is substantially vertically oriented, the first and second sensor coils 130 and 132 are said to be horizontally mounted. It is noted that one-half of the magnetic flux will flow through the first sensor coil 130 and the other-half of the magnetic flux will flow through the second sensor coil 132, as is understood by the artisan.

Figure 3:
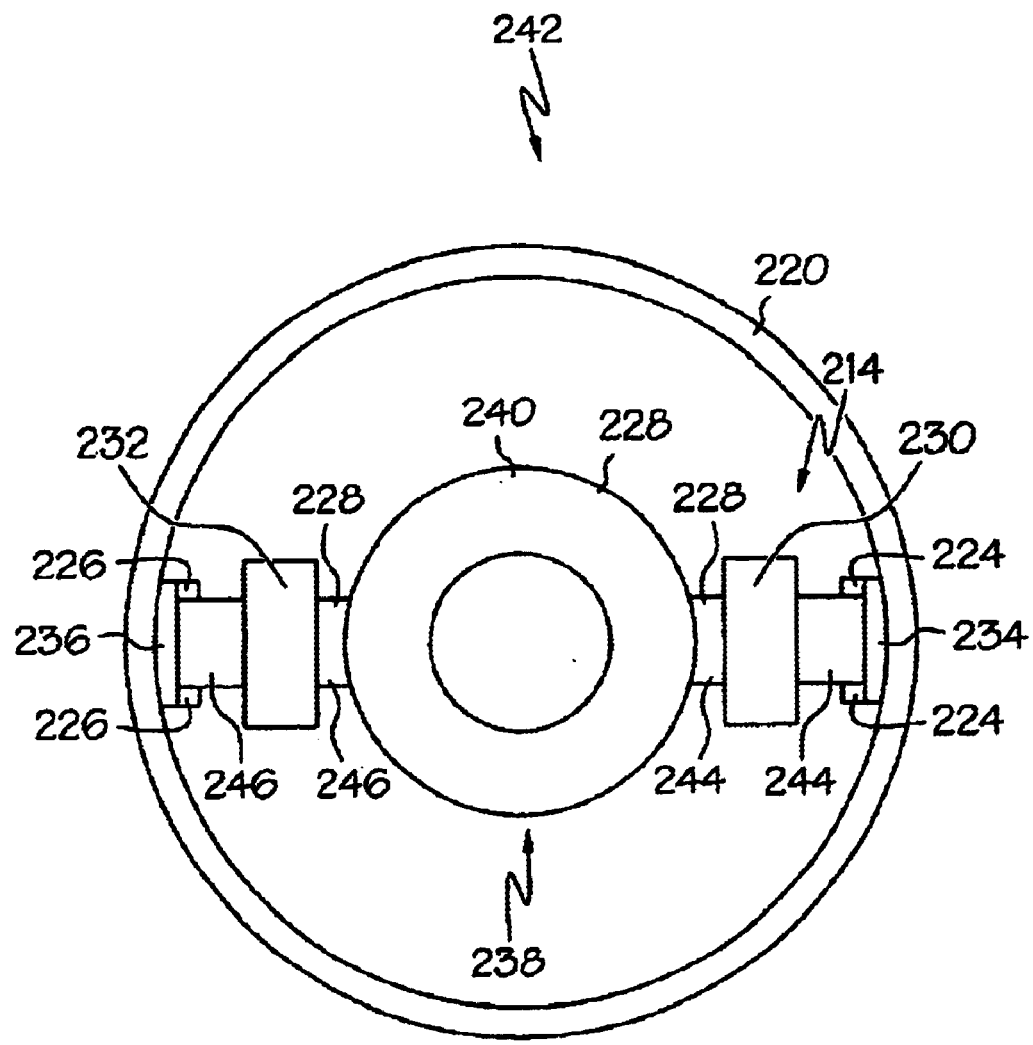
FIG. 3 is an end view of an alternate embodiment of a dust tube subassembly, with the top of the dust cover omitted, wherein the ring of the flux collector is smaller than that of FIGS. 1 and 2, wherein the flux collector includes arms connecting the ring to the prongs, and wherein the sensor coils surround a corresponding arm.

An alternate embodiment of a dust tube subassembly 242 (i.e., a subassembly including at least a dust tube 220 and at least some components of a relative velocity sensor 214) is shown in FIG. 3. In FIG. 3, the ring 240 of the flux collector 228 is smaller than that of FIGS. 1 and 2. In the embodiment of FIG. 3, the joining member 238 includes a first arm 244 connecting the ring 240 to the first prong 234 and includes a second arm 246 connecting the ring 240 to the second prong 236. The first sensor coil 230 surrounds the first arm 244, and the second sensor coil 232 surrounds the second arm 246. In an application where the piston rod is attached to a vehicle frame and is substantially vertically oriented, the first and second sensor coils 230 and 232 are said to be horizontally mounted. It is noted that all of the magnetic flux will flow through both the first and second sensor coils 230 and 232 improving the signal level of the relative velocity sensor 214, as is understood by the artisan. FIG. 3 also shows top-end portions of the first and second magnets 224 and 226.

In one extension of the second expression, not shown, the relative velocity sensor has more than two prongs, and/or more than two axially-extending magnets, and/or more than two sensor coils, as can be appreciated by the artisan. In one variation, an even number of symmetrically spaced apart prongs, symmetrically spaced apart magnets, and symmetrically spaced apart sensor coils are used.

A second expression of the first embodiment of FIG. 1 is for a piston damper assembly 10 including a piston damper 12 and a relative velocity sensor 14. The piston damper 12 includes a damper body (i.e., a damper cylinder) 16, a piston rod 18, and a dust tube 20. The piston rod 18 is axially movable within the damper body 16. The dust tube 20 is attached to the piston rod 18. The relative velocity sensor 14 includes an axially extending first magnet 24 which is supported by the dust tube 20, includes a flux collector 28, and includes a first sensor coil 30. The flux collector 28 is supported by the dust tube 20, includes an axially-extending first prong 34 in axially-extending proximity with the first magnet 24, includes an axially-extending second prong 36, and includes a joining member 38 connecting the first and second prongs 34 and 36. The first sensor coil 30 surrounds the joining member 38 and/or one of the first and second prongs 34 and 36.

It is noted that in the second expression of the embodiment of FIG. 1, the piston rod need not be attachable to a vehicle frame, such as the frame of an automobile or an airplane, but can be attachable to another structure. An application of the piston damper assembly 10 is use of the piston damper assembly 10 to provide motion resistance on exercise equipment such as stair climbers and rowing machines. A further application is use of the piston damper assembly 10 to provide motion isolation for a building, bridge, or other structure subject to earthquakes. An additional application is use of the piston damper assembly 10 to dampen vibrations encountered by vehicles and structures in outer space. Other applications are left to the artisan. It is also noted that the piston damper assembly 10 is not limited to a magnetorheological damper, but has application to any type of damper known or to be invented. The examples, variations, modifications, etc. of the first expression of the embodiment of FIG. 1, and of the embodiment of FIG. 2, are equally applicable to the second expression.

A third expression of the first embodiment of FIG. 1 is for a piston-damper dust tube subassembly 42 including an axially-extending piston damper dust tube 20 and a relative velocity sensor 14. The relative velocity sensor 14 includes an axially extending first magnet 24 which is supported by the dust tube 20, a flux collector 28, and a first sensor coil 30. The flux collector 28 is supported by the dust tube 20, includes an axially-extending first prong 34 in axially-extending proximity with the first magnet 24, includes an axially-extending second prong 36, and includes a joining member 38 connecting the first and second prongs 34 and 36. The first sensor coil 30 surrounds the joining member 38 and/or one of the first and second prongs 34 and 36. The examples, variations, modifications, extensions, etc. of the first and second expressions of the embodiment of FIG. 1, and of the embodiment of FIG. 2, are equally applicable to the third expression.

Several benefits and advantages are derived from one or more of the expressions of an embodiment of the invention. Having axially-extending flux collector prongs and an axially-extending magnet supported by the dust tube and having a sensor coil surround the flux collector, instead of having the piston rod act as a flux carrier, improves the accuracy of relative velocity measurements when the piston damper is a magnetorheological piston damper and/or when the piston rod undergoes a relatively long stroke, as can be appreciated by those skilled in the art.

The foregoing description of several expressions and embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

What is claimed is:
1. A piston damper assembly comprising:
 a) a piston damper including:
  (1) a damper body;
  (2) a piston rod which is axially movable within the damper body and which is attachable to a vehicle frame; and
  (3) a dust tube which circumferentially surrounds at least an axial portion of the damper body and which is attached to the piston rod; and
 b) a relative velocity sensor including:
  (1) spaced apart and axially extending first and second magnets which are supported by the dust tube;
  (2) a flux collector supported by the dust tube, including an axially-extending first prong in axially-extending contact with the first magnet, including an axially-extending second prong in axially-extending contact with the second magnet, and including a joining member connecting the first and second prongs; and
  (3) spaced apart first and second sensor coils, wherein the first sensor coil surrounds the joining member and/or the first prong and wherein the second sensor coil surrounds the joining member and/or the second prong.

2. The piston damper assembly of claim 1, wherein the piston damper is a magnetorheological damper.

3. The piston damper assembly of claim 1, wherein the first and second prongs are attached to the inside of the dust tube.

4. The piston damper assembly of claim 3, wherein the first magnet is attached to the first prong and wherein the second magnet is attached to the second prong.

5. The piston damper assembly of claim 1, wherein the joining member includes a ring coaxially aligned with the dust tube.

6. The piston damper assembly of claim 5, wherein the first and second prongs and the first and second magnets are substantially aligned along a diameter of the dust tube.

7. The piston damper assembly of claim 6, wherein the first sensor coil surrounds a first circumferential segment of the ring, wherein the second sensor coil surrounds a second circumferential segment of the ring, and wherein a line between the first and second sensor coils is substantially perpendicular to the diameter.

8. The piston damper assembly of claim 6, wherein the first sensor coil surrounds the first prong and wherein the second sensor coil surrounds the second prong.

9. The piston damper assembly of claim 5, wherein the joining member includes a first arm connecting the ring to the first prong and a second arm connecting the ring to the second prong, and wherein the first sensor coil surrounds the first arm and the second sensor coil surrounds the second arm.

10. The piston damper assembly of claim 1, wherein flux collector consists essentially of a ferromagnetic material.

11. A piston damper assembly comprising:
 a) a piston damper including:
  (1) a damper body;
  (2) a piston rod which is axially movable within the damper body; and
  (3) a dust tube which is attached to the piston rod; and
 b) a relative velocity sensor including:
  (1) an axially extending first magnet which is supported by the dust tube;
  (2) a flux collector supported by the dust tube, including an axially-extending first prong in axially-extending proximity with the first magnet, including an axially-extending second prong, and including a joining member connecting the first and second prongs; and (3) a first sensor coil which surrounds the joining member and/or one of the first and second prongs.

12. The piston damper assembly of claim 11, wherein the piston damper is a magnetorheological damper.

13. The piston damper assembly of claim 11, wherein the first prong is attached to the inside of the dust tube.

14. The piston damper assembly of claim 3, wherein the first magnet is attached to the first prong.

15. The piston damper assembly of claim 11, wherein flux collector consists essentially of a ferromagnetic material.

16. A piston-damper dust tube subassembly comprising:

a) an axially-extending piston-damper dust tube; and
b) a relative velocity sensor including:
 (1) an axially extending first magnet which is supported by the dust tube;
 (2) a flux collector supported by the dust tube, including an axially-extending first prong in axially-extending proximity with the first magnet, including an axially-extending second prong, and including a joining member connecting the first and second prongs; and
 (3) a first sensor coil which surrounds the joining member and/or one of the first and second prongs.

17. The piston damper assembly of claim 16, wherein the piston damper is a magnetorheological damper.

18. The piston damper assembly of claim 16, wherein the first prong is attached to the inside of the dust tube.

19. The piston damper assembly of claim 18, wherein the first magnet is attached to the first prong.

20. The piston damper assembly of claim 16, wherein flux collector consists essentially of a ferromagnetic material collector.

* * * * *